United States Patent
Nosov et al.

(10) Patent No.: US 10,310,955 B2
(45) Date of Patent: Jun. 4, 2019

(54) APPLICATION SERVICE-LEVEL CONFIGURATION OF DATALOSS FAILOVER

(71) Applicant: Microsoft Technology Licensing, LLC, Redmond, WA (US)

(72) Inventors: Alexander Evgenievich Nosov, Bellevue, WA (US); Daniel L. Lemmond, Redmond, WA (US); Sandeep Lingam, Redmond, WA (US); Sameer Arun Verkhedkar, Issaquah, WA (US); Tomas Talius, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 15/465,473

(22) Filed: Mar. 21, 2017

(65) Prior Publication Data
US 2018/0276091 A1    Sep. 27, 2018

(51) Int. Cl.
G06F 11/00    (2006.01)
G06F 11/20    (2006.01)
G06F 11/14    (2006.01)

(52) U.S. Cl.
CPC ...... *G06F 11/2094* (2013.01); *G06F 11/1464* (2013.01); *G06F 11/203* (2013.01); *G06F 11/2056* (2013.01); *G06F 11/2066* (2013.01); *G06F 11/2074* (2013.01); *G06F 2201/84* (2013.01)

(58) Field of Classification Search
CPC ............ G06F 11/1469; G06F 11/1446; G06F 11/1458; G06F 11/2094
See application file for complete search history.

(56) References Cited

U.S. PATENT DOCUMENTS

| | | | |
|---|---|---|---|
| 5,832,517 A | 11/1998 | Knutsen, II | |
| 6,097,882 A * | 8/2000 | Mogul | ............... H04L 67/1008 709/201 |
| 6,978,396 B2 | 12/2005 | Ruuth et al. | |
| 7,051,051 B1 | 5/2006 | Stegelmann | |
| 7,290,015 B1 | 10/2007 | Singhal et al. | |
| 7,386,557 B2 | 6/2008 | Barga et al. | |
| 7,941,697 B2 | 5/2011 | Mathew et al. | |
| 8,060,792 B2 | 11/2011 | Sivasubramanian et al. | |

(Continued)

OTHER PUBLICATIONS

"International Search Report & Written Opinion Issued in PCT Application No. PCT/US18/022281", dated Jun. 22, 2018, 12 Pages.

*Primary Examiner* — Charles Ehne
(74) *Attorney, Agent, or Firm* — Workman Nydegger

(57) ABSTRACT

Application service configuration of a timeframe for performing dataloss failover (failover that does not attempt full data replication to the secondary data store) from a primary data store to the secondary data store. A data-tier service, such as perhaps a database as a service (or DBaaS), could receive that configuration from the application service and automatically perform the dataloss failover as configured by the application service. This relieves the application service from having to manage the failover workflow while still allowing the application service to appropriately balance the timing of dataloss failover, which will depend on a very application-specific optimal balance between the negative effects of operational latency versus dataloss.

21 Claims, 4 Drawing Sheets

(56) References Cited

U.S. PATENT DOCUMENTS

| | | |
|---|---|---|
| 8,548,952 B2 | 10/2013 | Weissman et al. |
| 9,761,119 B1* | 9/2017 | Trundle ............... G08B 25/004 |
| 2008/0235294 A1 | 9/2008 | Girkar et al. |
| 2010/0325485 A1 | 12/2010 | Kamath et al. |
| 2012/0137173 A1 | 5/2012 | Burshan et al. |
| 2014/0108756 A1* | 4/2014 | Brown .................. G06F 3/0619 |
| | | 711/162 |
| 2015/0347547 A1 | 12/2015 | Kasheff et al. |
| 2016/0034357 A1* | 2/2016 | Anglin ................ G06F 11/1458 |
| | | 714/4.11 |
| 2016/0117375 A1 | 4/2016 | Antonopoulos |

* cited by examiner

APPLICATION SERVICE-LEVEL CONFIGURATION OF DATALOSS FAILOVER

BACKGROUND

Computing systems and associated networks have greatly revolutionized our world. Computing systems operate via the use of software, which includes instructions that instruct the hardware of a computing system to operate in particular ways. An "application service" is software that operates to receive and process requests using access to data. As an example, the application service might be a cloud application that responds to requests using logic defined by the software, and drawing upon data from a data store, such as one or more databases. That set of one or more databases may be offered to the application service as a database as an application service (or "DBaaS") that maintains and operates the data-tier for the application service. The DBaaS may, in fact, be offered as an application service to maintain and operate the data-tier for many cloud applications or other application services that each operate their own business logic.

Cloud applications that use DBaaS take advantage of the regional diversity (also called "geo-redundancy") of datacenters offered by the DBaaS as an economical way to protect their data from regional catastrophic failures, and thereby improve availability of the cloud application. Modern data replication technologies allow for maintaining readied (also called "hot") standby capacity and data replicas to achieve quick recovery from such failures. However, replication across regions involves sending data over internet with significant latencies. To minimize the performance impact of such latency, asynchronous replication protocols are typically used. As a result, the failover to the replica most often results in some amount of data loss (RPO).

Conventionally, the cloud application itself includes complex failure monitoring and failover management workflows in order to ensure high availability. The failover management workflows of the cloud application are made complex by having to account for the real possibility, probability, or even certainty, of dataloss that occurs during a failover to a geo-redundant replica that is not really an exact replica of the data the cloud application had access to prior to the failure.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In further embodiments, the application service may not only configure the dataloss failover time, but may also specify a dataloss-avoidant failover time. In that case, if recovery is not achieved prior to the dataloss-avoidant failover time, the data-tier attempts failover without any dataloss, but does not perform that failover at that time if it cannot be confirmed that the failover would avoid dataloss. In that case, if the attempt at dataloss-avoidant failover fails, then when the dataloss failover time arrives, if recovery still has not happened, then the dataloss failover is performed, which would likely result in dataloss.

Suppose now that the data-tier service detects that the primary data store (or a portion) is no longer available to the application service. In that case, if recovery (or datalossavoidant failover) is not achieved prior to that configured dataloss failover time, the data-tier service performs dataloss failure of the application service to the secondary data store without regard for whether there is fully replicated data in the secondary data store. The data-tier service may allow multiple application services to configure their own dataloss failover time (e.g., through directly declaring that timeframe, or indirectly via declaring a value of another parameter). Thus, the application services need not have a complex failover workflow while still having an enforced failover policy that respects its sensitivity to operational latency and dataloss. In some embodiments, the application service may even change its failover time as the nature of the balance in sensitivity to operation latency and dataloss changes during operation.

In further embodiments, the application service may not only configure the dataloss failover time, but may also specify a dataloss-avoidant failover time. In that case, if recovery is not achieved prior to the dataloss-avoidant failover time, the data-tier attempts failover without any dataloss, but does not perform that failover at that time if cannot be confirmed that the failover would avoid dataloss. In that case, if the attempt at dataloss-avoidant failover fails, then when the dataloss failover time arrives, if recovery still has not happened, then the dataloss failover is performed, which would likely result in dataloss.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
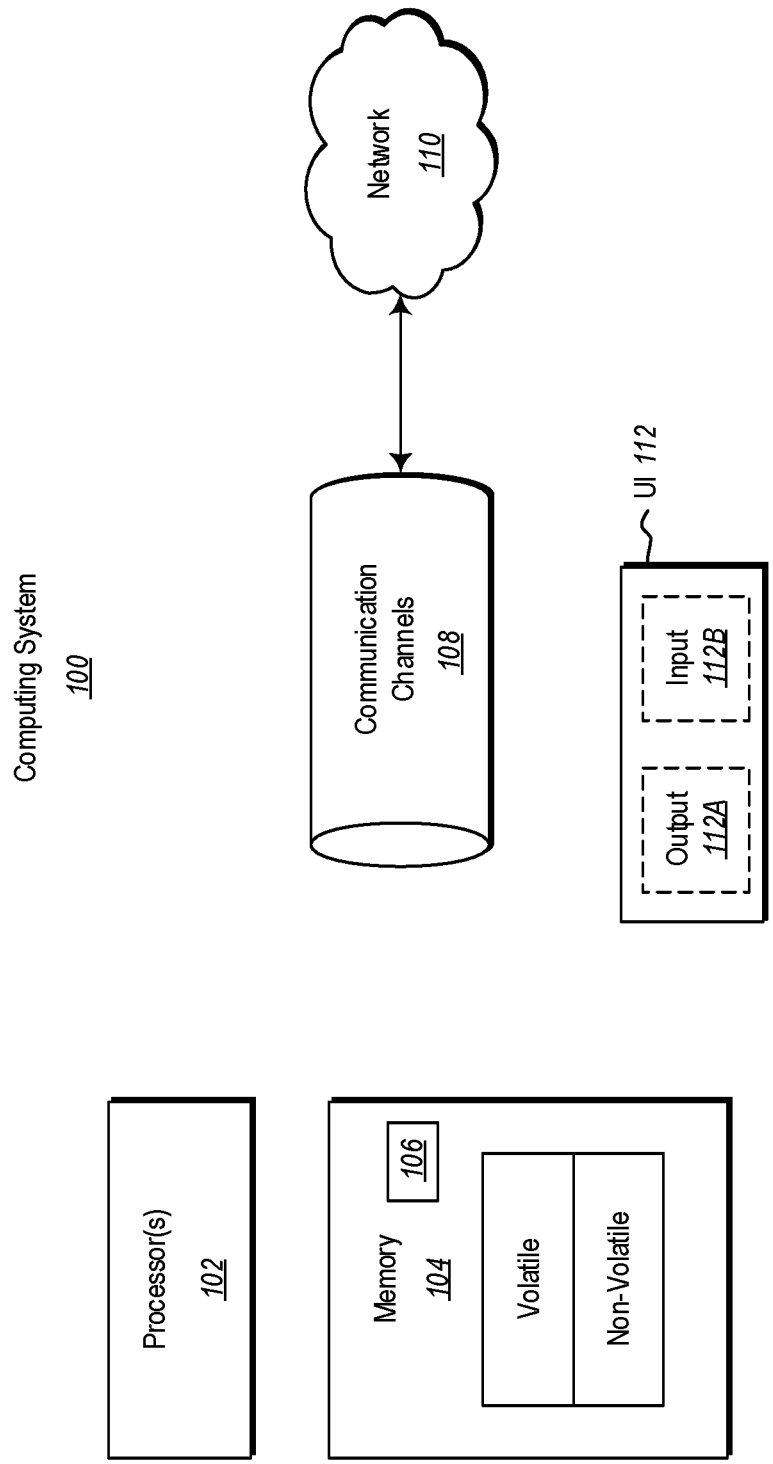
FIG. 1 illustrates an example computer system in which the principles described herein may be employed.

At least some embodiments described herein relate to the allowing a service (an "application service") to easily configure the timeframe for performing dataloss failover (failover that does not attempt full data replication to the secondary data store) from a primary data store to the secondary data store. A data-tier service, such as perhaps a database as a service (or DBaaS), could receive that configuration from the application service and automatically perform the dataloss failover as configured by the application service. This relieves the application service from having to manage the failover workflow while still allowing the application service to appropriately balance the timing of dataloss failover, which will depend on a very application-specific optimal balance between the negative effects of operational latency versus dataloss.

Suppose now that the data-tier service detects that the primary data store (or a portion) is no longer available to the application service. In that case, if recovery (or dataloss-avoidant failover) is not achieved prior to that configured dataloss failover time, the data-tier service performs dataloss failure of the application service to the secondary data store without regard for whether there is fully replicated data in the secondary data store. The data-tier service may allow multiple application services to configure their own dataloss failover time (e.g., through directly declaring that timeframe, or indirectly via declaring a value of another parameter). Thus, the application services need not have a complex failover workflow while still having an enforced failover policy that respects its sensitivity to operational latency and dataloss. In some embodiments, the application service may even change its failover time as the nature of the balance in sensitivity to operation latency and dataloss changes during operation.

In further embodiments, the application service may not only configure the dataloss failover time, but may also specify a dataloss-avoidant failover time. In that case, if recovery is not achieved prior to the dataloss-avoidant failover time, the data-tier attempts failover without any dataloss, but does not perform that failover at that time if cannot be confirmed that the failover would avoid dataloss. In that case, if the attempt at dataloss-avoidant failover fails, then when the dataloss failover time arrives, if recovery still has not happened, then the dataloss failover is performed, which would likely result in dataloss.

Because the principles described herein operate in the context of a computing system, a computing system will be described with respect to FIG. 1. Then, the principles of having application services control their own failover policy without having to have a workflow for failover will be described with respect to FIGS. 2 through 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
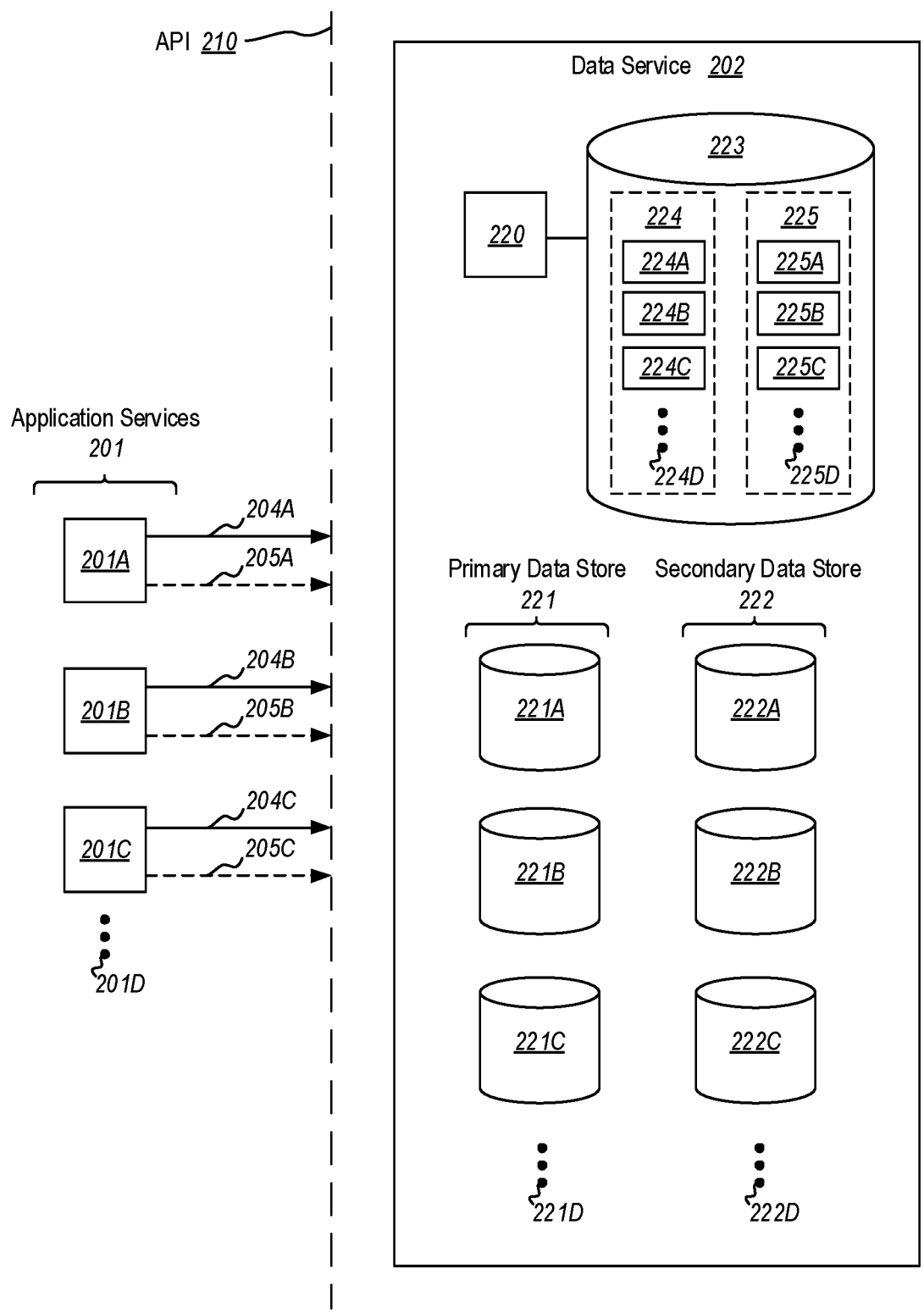
FIG. 2 schematically illustrates an example environment in which multiple application services interface with a data service via an application program interface, and the data service manages failover for each of the application services.

FIG. 2 schematically illustrates an example environment 200 in which the principles described herein may operate. The example environment includes multiple application services 201 and a data service 202. The data service 202 operates as a data tier for each of the application services 201. This allows the application services 201 to address more directly their own business logic and core functions, while delegating data storage and failover management functions to a remote data service 202.

Each of the application services 201 and the data service 202 may be a cloud computing service that operates in a cloud computing environment. A "service" is a type of application that receives requests from one or more other applications. Often, services are situated in a cloud computing environment because of the strong capability of a cloud computing environment to handle flexible and large amounts of processing and allocated memory and storage, thereby being able to flexibly respond to large and dynamically changing numbers of incoming requests.

In order for the data service 202 to operate as the data tier for the application services 201, the application services 201 and the data service 202 communicate using an Application Program Interface (API) 210. In one embodiment, the API 210 allows for data to be exchanged remotely. For instance, the API could use the HyperText Transport Protocol (HTTP) protocol to exchange data. As a more specific example, the API could use representational state transfer (REST) or (RESTful) web services. Such allows for data to be transferred in a declarative form. However, the principles described herein are not limited to the particular API that is used by the application services 201 and the data service 202 to communicate.

In the illustrated embodiment, the application services 201 are illustrated as including three application services 201A, 201B and 201C. However, the ellipses 201D represent that there may be any number of application services 201 that use the data service 202 as a data tier. There may be as few as zero application services that are using the data tier, but there is literally no limit to the number of applications services 201 that might use the data service 202, so long as the data service 202 can handle the volume of the application service communicating using the API 210.

The data service 202 provides data storage with high availability to each of the application services. In order to achieve high availability, the data service 202 has a management component 220 that tracks a primary data store and a secondary data store for each application service. In order to provide high availability, the primary data store is replicated to the secondary data store. In order to provide geographic redundancy, the primary data store and the secondary data stores may be remotely located. Thus, in case of a regional disaster or outage, or other regional cause for losing access to the primary data store, the associated application service may failover to the secondary data store.

However, because there is some distance (and latency) between the primary and secondary data stores, the replication from the primary to the secondary data store may be performed using asynchronous replication protocols. Asynchronous replication protocols are often used when latency between the primary and secondary data stores exceeds around two milliseconds, which can often occur when the primary and secondary data stores are geographically remote. Thus, in some circumstances, failover may not be possible without some data loss. Nevertheless, protection against geography-specific outages or damage is provided, thereby providing continued operation in that case, and thereby providing high availability of the data service.

If there is a failure in the connection between the application service and their respective primary data store, the management component 220 detects the failure and manages whether to perform failover so as to connect the application service to its secondary data store. Of course, there may be some data loss associated with this failover. In accordance with the principles described herein, it is the application service that defines the failover policy of how long to try to recover prior to performing a failover that could result in data loss. This type of dataloss is called herein a dataloss failover since it is performed regardless of whether dataloss will result, and thus dataloss may occur.

The management component 220 keeps track of the primary data store and the secondary data store for each application service. For instance, there are primary data stores 221 and secondary data stores 222. The primary data store 221A is the primary data store for the application service 201A. The secondary data store 222A is the secondary data store for the application service 201A. Likewise, the application service 201B has primary data store 221B and secondary data store 222B. The application service 201C has primary data store 221C and secondary data store 222C. The ellipses 221D and 222D represent that there are primary and secondary data stores tracked for as many application services as the data service 202 operates as the data tier for.

There is no requirement that the separately illustrated data stores within the data service 202 are actually physical different data stores. For instance, the secondary data store 222B and the primary data store 221A may be on the same storage device and node. However, they can be thought of as separate because the management component 220 provides appropriate security and isolation between the data that belongs to each application service.

In one embodiment, the data stores are structured data stores such as one or more databases. Accordingly, when replicating data to the secondary data store, the appropriate data structures are also properly replicated. In some embodiments, the management component may maintain multiple collections of structured data for an application service, each collection being replicated to the secondary. In that case, the management component may be thought of as maintaining multiple primary data stores (each being a collection of structured data) and secondary data stores for each application service. In that case, the decision on whether to failover a primary data store for a given application service may be made independently of whether another primary data store for that given application service is to failover.

The management component 220 maintains a dataloss failover parameter for each of the application services. The dataloss failover parameter is used by the management component 220 to determine whether, in case of at least a partial failure of a respective primary data store of a respective application service, the management component 220 should perform a dataloss failover to a respective secondary data store of the respective application service. A "dataloss failover" is a failover that does not attempt full data replication to the secondary data store. For instance, FIG. 2 illustrates a store 223 in which there are a collection 224 of dataloss failover parameters.

There is a dataloss failover parameter for each of the application services 201A, 202A and 203A. For instance, dataloss failover parameter 224A may correspond to the application service 201A and be usable by the management component 220 to determine whether, in case of at least partial failure of the primary data store 221A, the management component 220 should perform a dataloss failover of the application service 201A to the secondary data store 222A. Similarly, dataloss failover parameter 224B may correspond to the application service 201B and be usable by the management component 220 to determine whether, in case of at least partial failure of the primary data store 221B, the management component 200 should perform a dataloss failover of the application service 201B to the secondary data store 222B. Completing the example, dataloss failover parameter 224C may correspond to the application service 201C and be usable by the management component 220 to determine whether, in case of at least partial failure of the primary data store 221C, the management component 220 should perform a dataloss failover of the application service 201C to the secondary data store 222C.

Each application service may set, define, update or control its own dataloss failover parameter via interaction with the API 210. For instance, in FIG. 2, the application service 201A is shown as interacting (as represented by arrow 204A) with the API 210 in order to set, define, update or control the dataloss failover parameter 224A. Likewise, the application service 201B is shown as interacting (as represented by arrow 204B) with the API 210 in order to set, define, update or control the dataloss failover parameter 224B. Completing the example, the application service 201C is shown as interacting (as represented by arrow 204C) with the API 210 in order to set, define, update or control the dataloss failover parameter 224C. The ellipses 224D represent that there may be as many dataloss failover parameters as there are application services.

In some embodiments, the management component 220 also maintains a dataloss-avoidant failover parameter for each of the application services. The dataloss-avoidant failover parameter is used by the management component 220 to determine whether, in case of at least a partial failure of a respective primary data store of a respective application service, the management component should attempt a lossless failover to a respective secondary data store of the respective application service. For instance, FIG. 2 illustrates that the store 223 also includes a collection 225 of dataloss-avoidant failover parameters.

There may be a dataloss-avoidant failover parameter for each of the application services 201A, 202A and 203A. For instance, dataloss-avoidant failover parameter 225A may correspond to the application service 201A and be usable by the management component 220 to determine whether, in case of at least partial failure of the primary data store 221A, the management component 220 should attempt a lossless failover of the application service 201A to the secondary data store 222A. Similarly, dataloss-avoidant failover parameter 225B may correspond to the application service 201B and be usable by the management component 220 to determine whether, in case of at least partial failure of the primary data store 221B, the management component 220 should attempt lossless failover of the application service 201B to the secondary data store 222B. Completing the example, dataloss-avoidant failover parameter 225C may correspond to the application service 201C and be usable by the management component 220 to determine whether, in case of at least partial failure of the primary data store 221C, the management component 220 should perform a lossless failover to the secondary data store 222C.

Each application service may set, define, update or otherwise control its own dataloss-avoidant failover parameter via interaction with the API 210. For instance, in FIG. 2, the application service 201A is shown as interacting (as represented by arrow 205A) with the API 210 in order to set, define, update or control the dataloss-avoidant failover parameter 225A. Likewise, the application service 201B is shown as interacting (as represented by arrow 205B) with the API 210 in order to set, define, update or control the dataloss-avoidant failover parameter 225B. Completing the example, the application service 201C is shown as interacting (as represented by arrow 205C) with the API 210 in order to set, define, update or control the dataloss-avoidant failover parameter 225C. The ellipses 225D represent that there may be as many dataloss failover parameters as there are application services.

Figure 3:
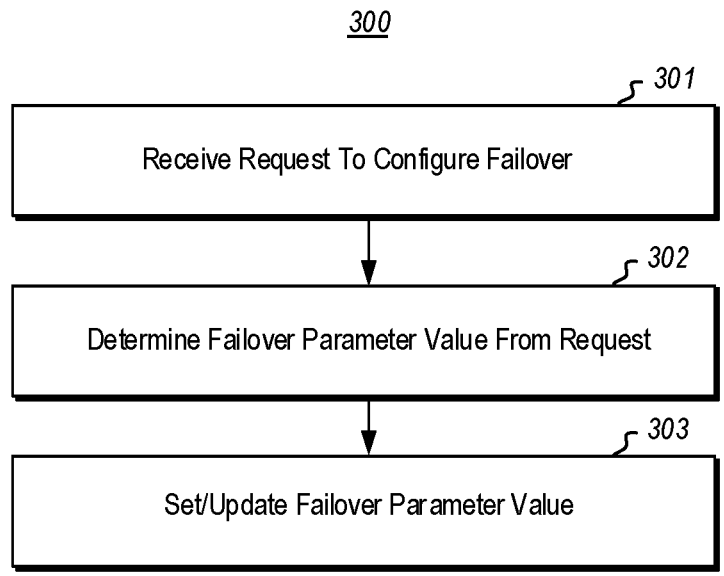
FIG. 3 illustrates a flowchart of a method for configuring potential failover for an application service, which may be performed in the environment of FIG. 2.

FIG. 3 illustrates a flowchart of a method 300 for configuring potential failover for an application service. The method 300 may be performed by, for instance, the data service 202 of FIG. 2, and may be performed each time the API 210 receives a request to set or update a failover parameter. Accordingly, the method 300 of FIG. 3 will be described with frequent reference to the example environment 200 of FIG. 2.

The method 300 is initiated upon receiving a request to configure failover for an application service (act 301). The request includes a representation of a dataloss failover parameter and/or a dataloss-avoidant failover parameter. The data management component 220 determines the appropriate failover parameter (act 302), and further sets or updates that failover parameter (act 303) as requested. As previously stated, the requests could comply with an API that uses the HyperText Transport Protocol (HTTP) protocol to exchange data. As a more specific example, the API could use representational state transfer (REST) or (RESTful) web services. Such allows for the requests to express data (such as the failover parameters and their respective values) in a declarative form. The request may be made at registration of the application service with the data service. In addition, the requests may be made after initial registration in order to update the parameters as the balance between operational latency and dataloss-sensitivity changes for a respective applications service.

Through such requests, the application service may control its own failover policy—not just initially, but as the application service operates. For instance, in FIG. 2, the arrow 204A symbolizes the application service 201A controlling failover policy by setting, defining, updating, or otherwise controlling the dataloss failover parameter 224A. Arrow 205A symbolizes the application service 201A controlling failover policy by setting, defining, updating, or otherwise controlling the dataloss-avoidant failover parameter 225A. Arrows 204B and 205B symbolize the same failover control by application service 201B over its own failover policy by setting, defining, updating or controlling the respective failover parameters 224B and 225B. Arrows 204C and 205C symbolize the same failover control by application service 201C over its own failover policy by setting, defining, updating or controlling the respective failover parameters 224C and 225C.

Figure 4:
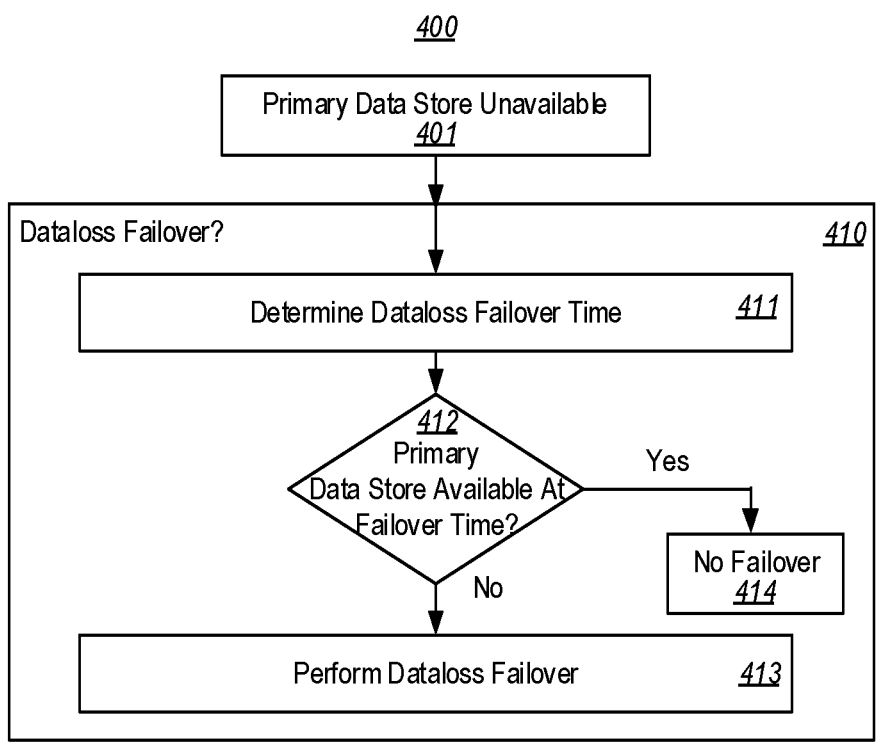
FIG. 4 illustrates a flowchart of a method for performing failover of an application service from a primary data store to a secondary data store in the case in which there was only a dataloss failover parameter for an application service, which method may be performed in the environment of FIG. 2.

FIG. 4 illustrates a flowchart of a method 400 for performing failover of an application service from a primary data store to a secondary data store. The method 400 illustrates how failover may be achieved if there were only a dataloss failover parameter for an application service. The method 400 may be performed by the management component 220 in failing over any of the application services 201.

Accordingly, the method 400 of FIG. 4 will now be described with frequent reference to the example environment 200 of FIG. 2.

The method 400 is initiated upon detecting that the primary data store for a particular application service is at least partially unavailable to the particular application service (act 401). In response, the management component performs or does not perform dataloss failover of the particular application service to a secondary data store if lossless recovery or failover has not already occurred prior to a dataloss failover time that corresponds to the maintained dataloss failover parameter for the particular application service (act 410).

In particular, the management component uses the maintained dataloss failover parameter for the particular application service to determine the dataloss failover time (act 411). If the primary data store of the particular application service is still not available to the particular application service at the dataloss failover time ("No" in decision block 412), the management component performs a dataloss failover of the particular application service to the secondary data store (act 413). Otherwise ("Yes" in decision block 414), the management component does not perform the dataloss failover, but simply keeps the application service connected to the primary data store.

Referring to FIG. 2, suppose that the management component 220 detects that the primary data store 221A is at least partially unavailable to the application service 201A (act 401). The management component 220 will determine the dataloss failover time from the dataloss failover parameter 224A (act 411). If the primary data store 221A is still not available to the application service 201A at the failover time ("No" in decision block 412), the management component 220 fails the application service 201A over to the secondary data store 222A (act 413).

Suppose now that the management component 220 detects that the primary data store 221B is at least partially unavailable to the application service 201B (act 401). The management component 220 will determine the dataloss failover time from the dataloss failover parameter 224B (act 411). If the primary data store 221B is still not available to the application service 201B at the failover time ("No" in decision block 412), the management component 220 fails the application service 201B over to the secondary data store 222B (act 413).

Completing the example, suppose now that the management component 220 detects that the primary data store 221C is at least partially unavailable to the application service 201C (act 401). The management component 220 will determine the dataloss failover time from the dataloss failover parameter 224C (act 411). If the primary data store 221C is still not available to the application service 201C at the failover time ("No" in decision block 412), the management component 220 fails the application service 201C over to the secondary data store 222C (413).

Figure 5:
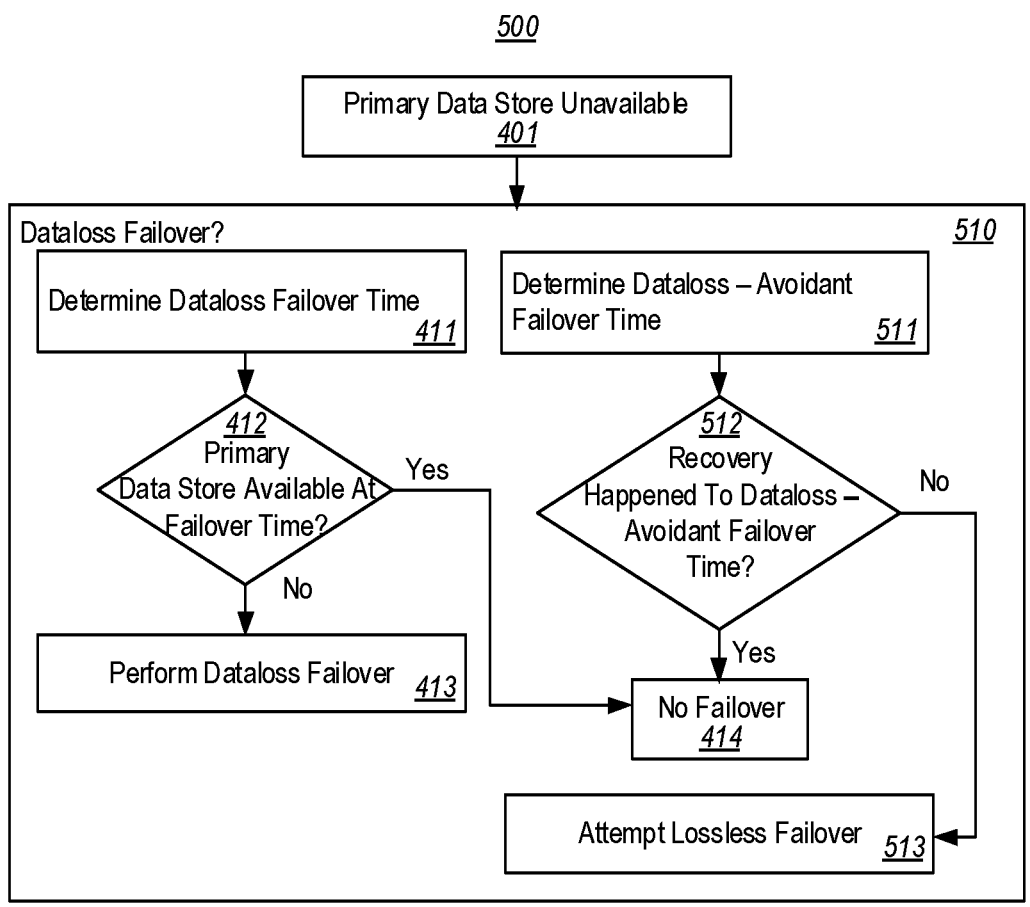
FIG. 5 illustrates a flowchart of a method for performing failover of an application service from a primary data store to a secondary data store in the case in which there is both a dataloss failover parameter and a dataloss-avoidant failover parameter for an application service, which method may be performed in the environment of FIG. 2.

FIG. 5 illustrates a flowchart of a method 500 for performing failover of an application service from a primary data store to a secondary data store. The method 500 illustrates how failover may be achieved if there were both a dataloss failover parameter and a dataloss-avoidant failover parameter for an application service. The method 500 of FIG. 5 is augmented from the method 400 of FIG. 4. The method 500 may be performed by the management component 220 for failing over any of the application services 210. Accordingly, the method 500 of FIG. 5 will now be described with frequent reference to the example environment 200 of FIG. 2.

The method 500 is also initiated upon detecting that the primary data store for a particular application service is at least partially unavailable to the particular application service (act 401). In response, the management component performs or does not perform dataloss failover of the particular application service to a secondary data store if lossless recovery or failover has not already occurred prior to a dataloss failover time for the particular application service (act 510).

In particular, the management component uses the maintained dataloss-avoidant failover parameter for the particular application service to determine the dataloss-avoidant failover time (act 511). At the dataloss-avoidant failover time, if recovery has not yet happened ("No" in decision block 512), the management component attempts to perform a lossless failover (act 513) of the respective application service to a respective secondary data store of the respective application service, such that a successful attempt prior to the dataloss failure time results in not performing the dataloss failover. Otherwise, if recovery has happened at the dataloss-avoidant failover time ("Yes" in decision block 512), no failover is performed (act 414).

In addition, the management component uses the maintained dataloss failover parameter for the particular application service to determine the dataloss failover time (act 411). If the primary data store of the particular application service is still not available to the particular application service at the dataloss failover time and if the attempt, if any, to perform lossless failover failed ("No" in decision block 412), the management component perform a dataloss failover of the particular application service to the secondary data store (act 413). Accordingly, a failed attempt to perform the lossless failover prior to the dataloss failure time results in performing the dataloss failover. On the other hand, if the primary data store is recovered to the particular application service at the dataloss failover time or if the attempt, if any, to perform lossless failover succeeded ("Yes" in decision block 412), no further failover is performed (act 414).

Referring to FIG. 2, suppose that the management component 220 detects that the primary data store 221A is at least partially unavailable to the application service 201A (act 401). The management component 220 will determine the dataloss-avoidant failover time from the dataloss-avoidant failover parameter 225A (act 511), and will also determine the dataloss failover time from the dataloss failover parameter 224A (act 411). If the primary data store 221A is still not available to the application service 201A at the dataloss-avoidant failover time ("No" in decision block 512), the management component attempts to perform lossless failover the application service 201A to the secondary data store 222A (act 513). If this cannot be achieved (or at least cannot be achieved prior to arrival of the dataloss failover time) ("No" in decision block 412), the management component 220 fails the application service 201A over to the secondary data store 222A anyway (act 413), which of course might mean data loss.

Suppose now that the management component 220 detects that the primary data store 221B is at least partially unavailable to the application service 201B (act 401). The management component 220 will determine the dataloss-avoidant failover time from the dataloss-avoidant failover parameter 225B (act 511), and will also determine the dataloss failover time from the dataloss failover parameter 224B (act 411). If the primary data store 221B is still not available to the application service 201B at the dataloss-avoidant failover time ("No" in decision block 512), the management component attempts to perform lossless failover the application service 201B to the secondary data store 222B (act 513). If this cannot be achieved (or at least cannot be achieved prior to arrival of the dataloss failover time) ("No" in decision block 412), the management component 220 fails the application service 201B over to the secondary data store 222B anyway (act 413), which of course might mean data loss.

Completing the example, suppose that the management component 220 detects that the primary data store 221C is at least partially unavailable to the application service 201C (act 401). The management component 220 will determine the dataloss-avoidant failover time from the dataloss-avoidant failover parameter 225C (act 511), and will also determine the dataloss failover time from the dataloss failover parameter 224C (act 411). If the primary data store 221C is still not available to the application service 201B at the dataloss-avoidant failover time ("No" in decision block 512), the management component attempts to perform lossless failover the application service 201C to the secondary data store 222C (act 513). If this cannot be achieved (or at least cannot be achieved prior to arrival of the dataloss failover time) ("No" in decision block 412), the management component 220 fails the application service 201C over to the secondary data store 222C anyway (act 413), which of course might mean data loss.

Thus, the principles described herein allow application services to finely control their own failover policy in circumstances in which there may not be complete replication between the primary and secondary data stores. This might be the case, for instance, where there is geo-redundancy provided by the data service. The application service may easily and declaratively set its own failover policy being in the best position to assess the best balance between the sensitivity to operational latency and sensitivity to dataloss during failover. The application service may set this policy once, but may perhaps even adjust the policy as the balance in sensitivity changes. Thus, application services maintain good control over failover policy while not needing complex workflows to handle failover.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having thereon computer-executable instructions that are structured such that, when executed by the one or more processors, cause the computing system to perform a method for managing at a data-tier level failover for application services that each define their own failover policy at a data-tier level and that are each serviced at the data-tier level by a respective primary data store and a respective secondary data store used to back up the respective primary data store during a failover, the method comprising:
   each application service communicating through an application program interface to a management component at the data-tier level, wherein said communication comprises defining a failover policy for each application service and wherein the failover policy is defined by:
   a dataloss failover parameter that defines at what point in time, in case of at least a partial failure of a respective primary data store of a respective application service, the respective application service should perform a dataloss failover to a respective secondary data store of the respective application service; and
   a dataloss-avoidant parameter that defines at what point in time, in the case of the at least partial failure of the respective primary data store of the respective application service, the respective application service should attempt a lossless failover to the respective secondary data store of the respective application service;
   the management component storing at the data-tier level the dataloss failover parameter and the dataloss-avoidant parameter for each application service;
   following a failure of the respective primary data store for a given application service, using the failover policy stored for the given application service to detect the following conditions:
   first, whether, at the point in time defined by the dataloss-avoidant parameter, lossless recovery of the respective primary data store for the given application service has not been accomplished; and
   second, whether, at the point in time defined by the dataloss failover parameter, the respective primary data store for the given application service is at least still partially unavailable to the given application service; and
   if the first and second conditions are both detected, thereafter performing a dataloss failover from the respective primary data store to the respective secondary data store of the given application service.

2. The computing system in accordance with claim 1, wherein each application service defines its own failover policy at the data-tier level so that each application service establishes its own way of balancing reduction in data loss on the one hand and reduction in latency on the other hand, during a failure of the primary data store for a respective application service.

3. The computing system in accordance with claim 2, wherein the dataloss-avoidant parameter and the dataloss failover parameter of the failover policy for each application service are registered and stored by the management component at a data store maintained at the data-tier level during initiation of each application service.

4. The computing system in accordance with claim 3, wherein the dataloss-avoidant parameter for one or more application services is updated at a point in time after initiation of the one or more applications services.

5. The computing system in accordance with claim 3, wherein the dataloss failover parameter for one or more application services is updated at a point in time after initiation of the one or more applications services.

6. The computing system in accordance with claim 1, wherein:
   if the first condition is not detected, the failover policy of the given application service causes the system to operate by determining whether recovery of the primary data store for the given application service has occurred prior to the time defined by the dataloss-avoidant parameter and if so, not attempting a lossless failover to the respective secondary data store, and not performing a dataloss failover; and
   if the first condition is detected but the second condition is not detected, the failover policy of the given application service causes the system to operate by determining whether recovery of the primary data store for the given application service has occurred prior to the time defined by the dataloss failover parameter and if so, not performing a dataloss failover.

7. The computing system in accordance with claim 1, wherein the management component stores the failover policy for each application service in a data store maintained at the data-tier level.

8. The computing system in accordance with claim 1, wherein one or more of the primary data stores or one or more of the secondary data stores reside on a storage device and node, and wherein the one or more primary data stores or one or more secondary data stores still provide separate data storage for corresponding application services as a result of security and isolation provided by the management component between data that belongs to each application service.

9. The computing system in accordance with claim 1, wherein one or more of the primary data stores comprise a set of one or more databases.

10. A computer-implemented method performed by one or more processors executing computer-executable instructions, wherein the computer-implemented method manages at a data-tier level failover for application services that are each serviced at the data-tier level by a respective primary data store and a respective secondary data store used to back up the respective primary data store during a failover, the computer-implemented method comprising:
  each application service communicating through an application program interface to a management component at the data-tier level, wherein said communication comprises defining a failover policy for each application service and wherein the failover policy is defined by:
    a dataloss failover parameter that defines at what point in time, in case of at least a partial failure of a respective primary data store of a respective application service, the respective application service should perform a dataloss failover to a respective secondary data store of the respective application service; and
    a dataloss-avoidant parameter that defines at what point in time, in the case of the at least partial failure of the respective primary data store of the respective application service, the respective application service should attempt a lossless failover to the respective secondary data store of the respective application service;
  the management component storing at the data-tier level the dataloss failover parameter and the dataloss-avoidant parameter for each application service;
  following a failure of the respective primary data store for a given application service, using the failover policy stored for the given application service to detect the following conditions:
    first, whether, at the point in time defined by the dataloss-avoidant parameter, lossless recovery of the respective primary data store for the given application service has not been accomplished; and
    second, whether, at the point in time defined by the dataloss failover parameter, the respective primary data store for the given application service is at least still partially unavailable to the given application service; and
  if the first and second conditions are both detected, thereafter performing a dataloss failover from the respective primary data store to the respective secondary data store of the given application service.

11. The computer-implemented method in accordance with claim 10, wherein each application service defines its own failover policy at the data-tier level so that each application service establishes its own way of balancing reduction in data loss on the one hand and reduction in latency on the other hand, during a failure of the primary data store for a respective application service.

12. The computer-implemented method in accordance with claim 11, wherein the dataloss-avoidant parameter and the dataloss failover policy for each application service is registered and stored by the management component at a data store maintained at the data-tier level during initiation of each application service.

13. The computer-implemented method in accordance with claim 12, wherein the dataloss-avoidant parameter for one or more application services is updated at a point in time after initiation of the one or more applications services.

14. The computer-implemented method in accordance with claim 12, wherein dataloss failover parameter for one or more application services is updated at a point in time after initiation of the one or more applications services.

15. The computer-implemented method in accordance with claim 10, wherein:
  if the first condition is not detected, the failover policy of the given application service causes the system to operate by determining whether recovery of the primary data store for the given application service has occurred prior to the time defined by the dataloss-avoidant parameter and if so, not attempting a lossless failover to the respective secondary data store, and not performing a dataloss failover; and
  if the first condition is detected but the second condition is not detected, the failover policy of the given application service causes the system to operate by determining whether recovery of the primary data store for the given application service has occurred prior to the time defined by the dataloss failover parameter and if so, not performing a dataloss failover.

16. The computer-implemented method in accordance with claim 10, wherein the management component stores the failover policy for each application service in a data store maintained at the data-tier level.

17. The computer-implemented method in accordance with claim 10, wherein one or more of the primary data stores or one or more of the secondary data stores reside on a storage device and node, and wherein the one or more primary data stores or one or more secondary data stores still provide separate data storage for corresponding application services as a result of security and isolation provided by the management component between data that belongs to each application service.

18. The computer-implemented method in accordance with claim 10, wherein one or more of the primary data stores comprise a set of one or more databases.

19. A computer-implemented method performed by one or more processors executing computer-executable instructions, wherein the computer-implemented method manages at a data-tier level failover for application services that are each serviced at the data-tier level by a respective primary data store and a respective secondary data store used to back up the respective primary data store during a failover, the computer-implemented method comprising:
  receiving at a management component at the data-tier level a failover policy defined by each application service, wherein the failover policy is communicated to the management component by each application service through an application program interface for the data-tier level, wherein said communication comprises defining a failover policy for each application service and wherein the failover policy is defined by:
   a dataloss failover parameter that defines at what point in time, in case of at least a partial failure of a respective primary data store of a respective application service, the respective application service should perform a dataloss failover to a respective secondary data store of the respective application service; and
   a dataloss-avoidant parameter that defines at what point in time, in the case of the at least partial failure of the respective primary data store of the respective application service, the respective application service should attempt a lossless failover to the respective secondary data store of the respective application service;
the management component storing at the data-tier level the dataloss failover parameter and the dataloss-avoidant parameter for each application service;
following a failure of the respective primary data store for a given application service, the management component using the failover policy stored for the given application service to detect the following conditions:
   first, whether, at the point in time defined by the dataloss-avoidant parameter, lossless recovery of the respective primary data store for the given application service has not been accomplished; and
   second, whether, at the point in time defined by the dataloss failover parameter, the respective primary data store for the given application service is at least still partially unavailable to the given application service; and
if the first and second conditions are both detected, thereafter the management component performing a dataloss failover from the respective primary data store to the respective secondary data store of the given application service so that in accordance with the failover policy defined by the given application service, any further latency resulting from the dataloss failover from the respective primary data store to the respective secondary data store will be reduced irrespective of any likely data loss that may occur during the dataloss failover.

20. The computer-implemented method in accordance with claim 19, wherein each application service defines its own failover policy at the data-tier level so that each application service establishes its own way of balancing reduction in data loss on the one hand and reduction in latency on the other hand, during a failure of the primary data store for a respective application service.

21. The computer-implemented method in accordance with claim 19,
   wherein if the first condition is not detected, the failover policy of the given application service causes the system to operate by performing the following:
      determine whether recovery of the primary data store for the given application service has occurred prior to the time defined by the dataloss-avoidant parameter and if so, not attempting a lossless failover to the respective secondary data store, and not performing a dataloss failover; and
   wherein if the first condition is detected but the second condition is not detected, the failover policy of the given application service causes the system to operate by performing the following:
      determine whether recovery of the primary data store for the given application service has occurred prior to the time defined by the dataloss failover parameter and if so, not performing a dataloss failover.

* * * * *